(No Model.) 3 Sheets—Sheet 1.

G. W. KIRKPATRICK.
GRAIN DRILL.

No. 541,362. Patented June 18, 1895.

Witnesses
Raymond P. Barnes.
F. Stanly Elmor

Inventor
G. W. Kirkpatrick
By P. T. Dodge
Attorney (No Model.) 3 Sheets—Sheet 2.

G. W. KIRKPATRICK.
GRAIN DRILL.

No. 541,362. Patented June 18, 1895.

Witnesses
Raymond Barnes
J. Hardy Elmer

Inventor
G. W. Kirkpatrick
By P. T. Dodge
Attorney (No Model.) 3 Sheets—Sheet 3.
G. W. KIRKPATRICK.
GRAIN DRILL.
No. 541,362. Patented June 18, 1895.
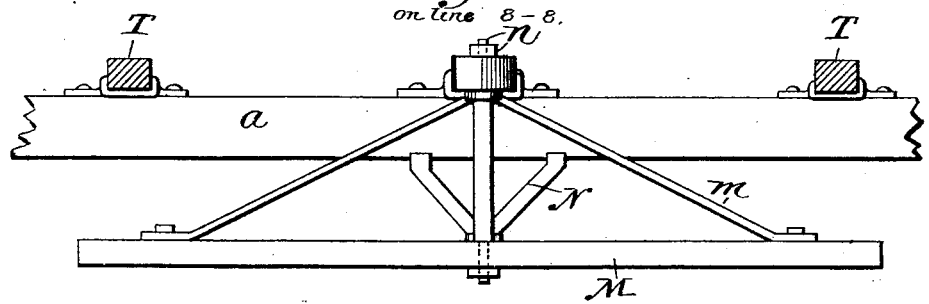
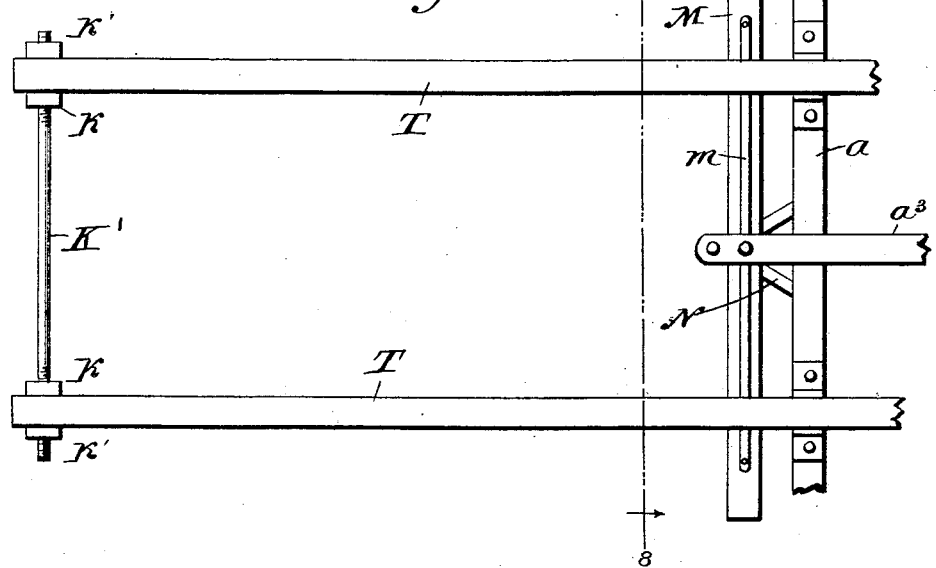
Witnesses:
F. A. Elmore
E. Ashley
Inventor.
G. W. Kirkpatrick
By P. T. Dodge
Atty

UNITED STATES PATENT OFFICE.

GEORGE W. KIRKPATRICK, OF MACEDON, NEW YORK.

GRAIN-DRILL.

SPECIFICATION forming part of Letters Patent No. 541,362, dated June 18, 1895.

Application filed August 31, 1892. Serial No. 444,661. (No model.)

*To all whom it may concern:*

Be it known that I, GEORGE W. KIRKPATRICK, of Macedon, county of Wayne, and State of New York, have invented a new and useful Improvement in Grain-Drills, of which the following is a specification.

My invention has reference to grain drills, in which a wheeled frame is provided with a series of drill runners or shoes to open furrows in the soil, with mechanism for distributing the seed through the conducting tubes into said furrows.

The invention has reference, first, to improvements in the construction of the main-frame, intended to prevent the same from sagging or twisting out of shape under the strains to which it is subjected in practice, and, second, to the arrangement of runners or shoes, in two distinct ranks, as hereinafter explained in detail, to prevent the accumulation of rubbish thereon.

Figure 1:
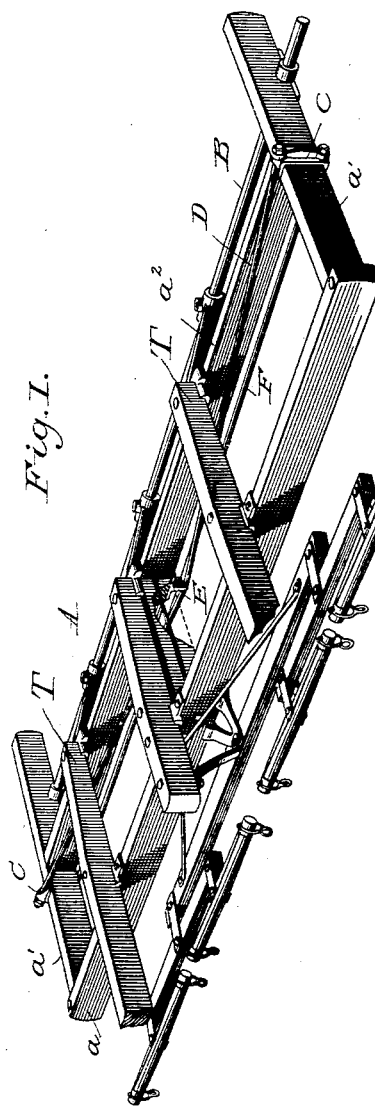
Figure 2:
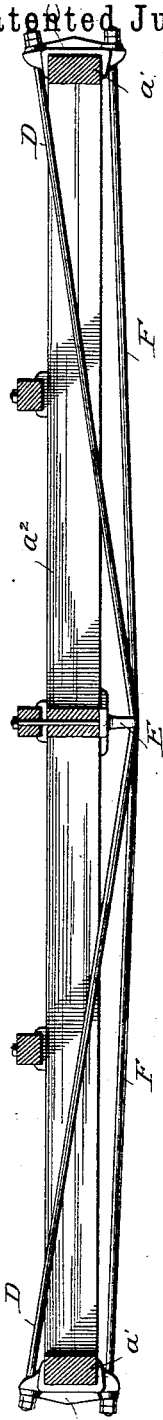
Figure 3:
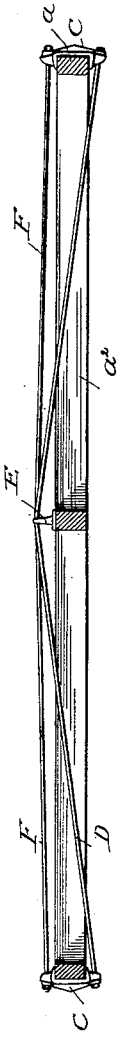
Figure 4:
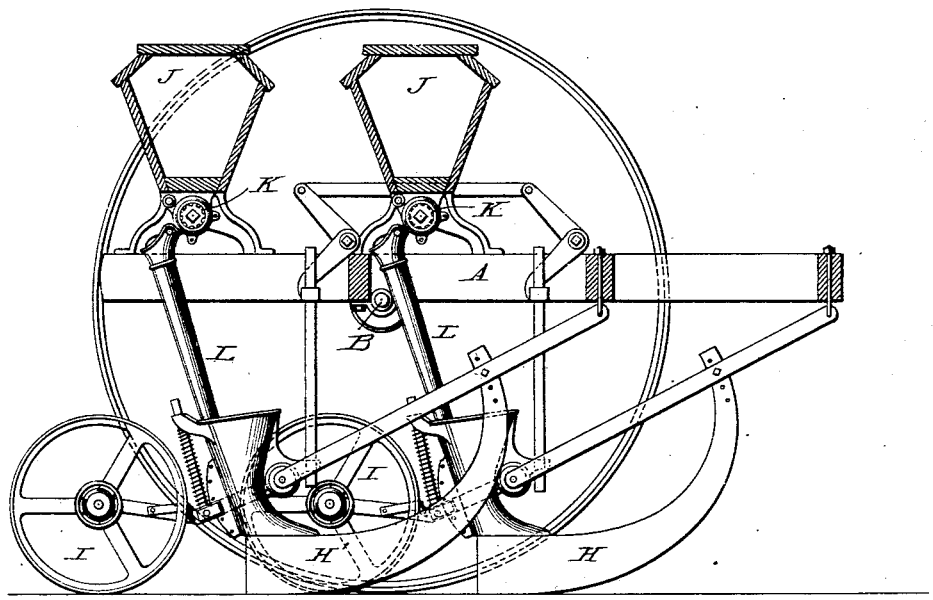
Figure 5:
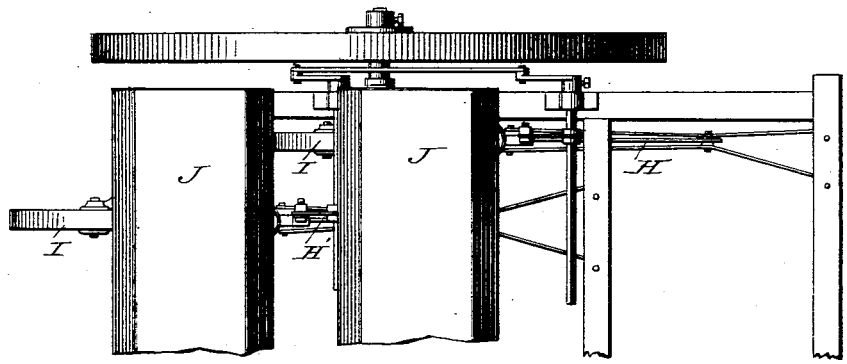
Figure 6:
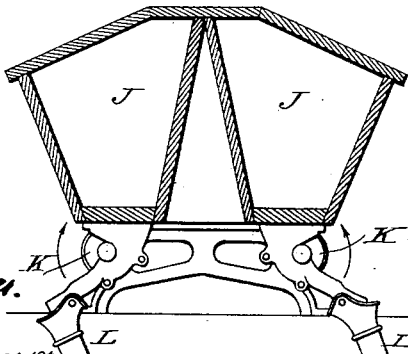

In the accompanying drawings, Figure 1 is a perspective view illustrating the construction of the main frame. Fig. 2 is a transverse vertical section of the same. Fig. 3 is a diagram representing a different arrangement of the truss-rods. Fig. 4 is a longitudinal vertical section through a drill provided with two ranks or rows of shoes in accordance with my invention. Fig. 5 is a top plan view of one side of the same. Fig. 6 is a view of a modified form of the seed-hopper. Fig. 7 is a broken plan view on a reduced scale, showing the manner of connecting the tongues at their front ends. Fig. 8 is a transverse section on the line 8 8 in Fig. 7, showing the manner of mounting and trussing the four-horse poubletree or evener with which the machine is supplied.

Referring to Figs. 1 and 2, A represents the main-frame consisting of two cross-bars $a$ and $a$, and two side-bars $a'$, extending in a fore and aft direction to an axle B, lying parallel with the front bar, and adapted to receive the ground wheels on its ends, as usual As these frames are usually constructed, it is found that when the series of furrow-openers are attached to them and the weight of the grain boxes received upon the top, they are liable to twist or work out of shape, the result being loss of strength and rigidity.

In applying my improvement, I apply vertically across the outer side of each of the side-bars $a'$, a metal bearing-plate C, allowing its ends to project above and below the side-bar. Through the upper ends of these plates, above the frame, from one side of the machine to the other, I pass a strong truss-rod D, arranged to bear beneath a bridge or block E, which is situated against the under side of the cross-bar $a^2$, midway of its length. I also pass through the lower ends of the plates C, beneath the frame, a second truss-rod F, which also extends across the entire width of the frame and under and against the same. The rods are brought to a high tension and securely fixed at their ends to the respective plates, either by means of nuts applied to their threaded ends outside of the plates, as shown, or in any other suitable manner.

It will be observed that by the use of the bearing plates or saddles C, lying across the outer face of the frame bars, I am enabled to avoid boring, cutting or otherwise weakening the bars; also that the two rods drawing inward upon the plates hold them securely to their seats against the outer sides of the frame-bars, which are thus held properly in position, so as to prevent them from twisting or working out of position. The two rods serve an efficient purpose in sustaining the middle portion of the frame and preventing it from sagging or yielding under the weight which it is required to carry.

The essence of the invention in this regard resides, first, in the employment of truss rods arranged in vertically diminishing lines, and, second, in the employment of two truss-rods in connection with two bearing-plates outside of the frame, and it is manifest that the form of the plates and of the bridge or bearing E, and the position of the rods may be modified provided an arrangement and mode of action, substantially such as herein described, is retained.

In certain classes of machines of great width using a large number of runners or shoes and pressure devices to force them into the ground, it is found that there is a tendency of the frame to spring upward at the middle. In this class of machines I propose to employ the truss-rods in an inverted position, as shown in Fig. 3; that is to say, extending from their outer ends upward over the intermediate bridge.

The rods thus arranged may be used alone or in addition to those arranged as in Fig. 1.

Any drill-frame in which two truss-rods extending from side to side are passed through or secured to the ends of plates lying across the outer side of the frame bars falls within the spirit and scope of my invention.

The second part of my invention has reference to drills in which runners or shoes are employed; that is to say, shoes having runners upwardly curved at the forward end, to open the furrows, with follower wheels or drag chains carried immediately behind the shoes to close the furrows. In this class of machines it is customary to arrange an entire series of shoes in a single line or rank, or practically so. Owing to their form and to the close order in which they travel, great difficulty is experienced by the accumulation of a windrow of rubbish or soil in front of the runners, making it necessary to frequently raise them from the ground, and causing a great amount of extra labor on the part of the operator. To overcome this difficulty I propose to arrange the alternate runners or shoes in two distinct transverse lines, so that those in the front line will be entirely clear of those in the rear line, not only at the point of contact with the soil, but throughout the entire length of the portion which is in contact with the soil.

In connection with the two series of runners thus arranged, I prefer to employ two grain boxes or hoppers, each with its own system of distributing devices similar to those in common use.

Referring to Figs. 4 and 5, H represents the runners or shoes of the front rank or row carried by drag-bars, as usual, connected to the front of the main-frame, and H' are the runners of the rear row, their forward ends at the point where they enter the soil falling behind the heel ends of the runners in the front row so as to leave a clear transverse space between the two rows or series, as shown in Fig. 4.

The runners may be constructed in all respects in the ordinary manner and combined with the ordinary mechanisms for raising and lowering them and forcing them into the soil, and each runner may be provided in any approved manner with a follower wheel or drag-chain I.

J J represent two hoppers or seed boxes provided with distributers K, and conductors L, for delivering the seed from the distributers to the shoes in the respective ranks.

It will be observed that the follower wheels of the front shoes stand nearly in line with the forward ends of the rear shoes, at the point where the latter enter the soil, which is advantageous in that the wheels tend to press down and hold stalks and other obstructive matters, so that the runners may cut through or pass over them.

In Fig. 6 I have represented the seed hopper in the form of a single box with two independent compartments each of which is provided with distributers K, driven in opposite directions to deliver the seed respectively to the forwardly and backwardly extending conductors L. In this construction the two compartments though embraced in a single structure, are practically separate and independent hoppers, each having its own distributing mechanism, and this construction is therefore to be regarded as the equivalent of the separately constructed and mounted hoppers shown in Fig. 4.

Referring to Figs. 1 and 7, T, T designate two parallel tongues rigidly bolted upon the cross bars of the frame. In order that the tongues may be maintained in rigid relation to each other and prevented from swinging from or toward each other at their front ends, I extend through them, at a point in advance of the draft animals, a rod K' threaded at its ends, and apply to the threaded ends, between the tongues, nuts $k, k$, to hold the tongues apart, and at the outer sides nuts $k', k'$, to hold them together. Under this construction and arrangement the tongues are held rigidly in position and prevented from moving relatively to each other.

Referring now to Figs. 1 and 8, of the drawings M designates the four horse double-tree or evener pivoted at its center to a bracket N, securely bolted to the under side of the frame and extending in front of the cross bar $a$.

$m$ designates a truss rod having its ends securely bolted to the evener at or near the ends of the latter and arched as shown so that its central portion approaches to within a short distance of an overhanging central bar $a^3$ of the frame with which it is connected by a draw bolt $n$ located vertically above the pivot bolt which connects the evener with the bracket. Thus by tightening the draw-bolt the ends of the evener may be trussed up to any desired extent to resist downward strains and flexure of the evener.

Having thus described my invention, what I claim is—

1. In combination with a wheeled frame having side-bar saddle-plates applied to the outer sides of the bars, and two truss-rods passed through the respective ends of the plates from one side of the frame to the other.

2. The frame having side-bars, in combination with the plates applied to said bars, two truss-rods extending through the plates respectively above and below the frame bars, and bent in the same direction, across a suitable bridge or bearing at the middle of the frame.

3. In a grain-drill the wheeled main-frame, in combination with two rows of runner shoes, arranged one in advance of the other, substantially as described; and two independent seed-boxes provided with feed mechanisms connected to the front and rear shoes respectively.

4. A grain-drill having runner shoes arranged alternately in two rows or ranks, the shoes of the front row provided with follower wheels, in line with the front ends of the rear shoes, whereby the follower wheels act to press down and hold stalks and other obstructive matter so that the runners may cut through and pass over them.

5. The combination with the frame and with the double-tree or evener pivotally connected therewith, of a truss rod applied to the evener, as shown and means for trussing up the ends of the evener.

6. The combination of the main frame provided with the forwardly projecting bar $a^3$, the bracket, the evener pivoted to the bracket, the truss-rod on the evener, and the draw-bolt adjustably connecting the truss-rod with the bar $a^3$.

In testimony whereof I hereunto set my hand, this 25th day of April, 1892, in the presence of two attesting witnesses.

GEORGE W. KIRKPATRICK.

Witnesses:
    H. J. CARL,
    THOMAS COUGHLIN.